United States Patent
Fujinuma (10) Patent No.: US 12,398,474 B2
(45) Date of Patent: Aug. 26, 2025

(54) CARBON DIOXIDE REDUCTION DEVICE, AND POROUS ELECTRODE

(71) Applicant: SEKISUI CHEMICAL CO., LTD., Osaka (JP)

(72) Inventor: Naohiro Fujinuma, Glassboro, NJ (US)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 18/238,766

(22) Filed: Aug. 28, 2023

(65) Prior Publication Data

US 2023/0407494 A1    Dec. 21, 2023

Related U.S. Application Data (62) Division of application No. 16/633,267, filed as application No. PCT/JP2018/033888 on Sep. 12, 2018, now Pat. No. 11,788,195.

(30) Foreign Application Priority Data

Sep. 27, 2017 (JP) ................... 2017-186726

(51) Int. Cl.
| | |
|---|---|
| C25B 11/031 | (2021.01) |
| C25B 1/23 | (2021.01) |
| C25B 3/26 | (2021.01) |
| C25B 9/19 | (2021.01) |
| C25B 11/044 | (2021.01) |

(52) U.S. Cl.
CPC ............. *C25B 11/031* (2021.01); *C25B 1/23* (2021.01); *C25B 3/26* (2021.01); *C25B 9/19* (2021.01); *C25B 11/044* (2021.01)

(58) Field of Classification Search
None
See application file for complete search history.

(56) References Cited

U.S. PATENT DOCUMENTS

| | | | |
|---|---|---|---|
| 5,171,644 | A | 12/1992 | Tsou et al. |
| 11,322,765 | B2 | 5/2022 | Serov |
| 2006/0033226 | A1* | 2/2006 | Wang ............... H01M 4/622 |
| | | | 264/29.6 |
| 2011/0034325 | A1 | 2/2011 | Catanorchi et al. |
| 2012/0055804 | A1 | 3/2012 | Bettelheim et al. |
| 2012/0270138 | A1 | 10/2012 | Koshino et al. |
| 2013/0048506 | A1 | 2/2013 | Chen |
| 2013/0186771 | A1 | 7/2013 | Zhai |
| 2014/0326603 | A1 | 11/2014 | Kamai et al. |
| 2015/0129431 | A1 | 5/2015 | Winther-Jensen et al. |
| 2015/0303487 | A1 | 10/2015 | Kamai |
| 2016/0107154 | A1 | 4/2016 | Masel et al. |
| 2017/0149070 | A1 | 5/2017 | Kamai et al. |
| 2017/0191174 | A1 | 7/2017 | Agarwal et al. |
| 2018/0053958 | A1 | 2/2018 | Serov |

FOREIGN PATENT DOCUMENTS

| | | |
|---|---|---|
| CN | 63-38593 | 2/1988 |
| CN | 1802762 | 7/2006 |
| CN | 102027621 | 4/2011 |
| CN | 103493266 | 1/2014 |
| CN | 103501901 | 1/2014 |
| CN | 103668311 | 3/2014 |
| CN | 103987442 | 8/2014 |
| CN | 105776130 | 7/2016 |
| CN | 106463735 | 2/2017 |
| CN | 106517136 | 3/2017 |
| CN | 106868535 | 6/2017 |
| CN | 106964383 | 7/2017 |
| JP | 2003-213472 | 7/2003 |
| JP | 2008-258152 | 10/2008 |
| JP | 5017499 | 6/2012 |
| JP | 5376381 | 10/2013 |
| JP | 2015-63424 | 4/2015 |
| JP | 2015-525296 | 9/2015 |
| JP | 2017-526804 | 9/2017 |
| KR | 10-2018-0088195 | 8/2018 |
| WO | 2005/008813 | 1/2005 |
| WO | 2012/064279 | 5/2012 |
| WO | 2012/107838 | 8/2012 |

OTHER PUBLICATIONS

Fu et al, In Situ Polymer Graphenization Ingrained with Nanoporosity in a Nitrogenous Electrocatalyst Boosting the Performance of Polymer-Electrolyte-Membrane Fuel Cells, Advanced Materials, vol. 29, No. 7, Dec. 2016, Article No. 1604456, pp. 1-8 (Year: 2106).*

Lefevre et al, Molecular Oxygen Reduction in PEM Fuel Cells: Evidence for the Simultaneous Presence of Two Active Sites in Fe-Based Catalysts, The Journal of Physical Chemistry B, vol. 106, No. 34, Jul. 2002, pp. 8705-8713 (Year: 2002).*

Artyushkova et al, Chemistry of Multitudinous Active Sites for Oxygen Reduction Reaction in Transition Metal-Nitrogen-Carbon Electrocatalysts, The Journal of Physical Chemistry C, vol. 119, No. 46, Oct. 2015, pp. 25917-25928 (Year: 2015).*

International Search Report (ISR) issued Nov. 6, 2018 in International (PCT) Application No. PCT/JP2018/033888.

(Continued)

*Primary Examiner* — Harry D Wilkins, III (74) *Attorney, Agent, or Firm* — WENDEROTH, LIND & PONACK, L.L.P.

(57) ABSTRACT

A carbon dioxide reduction device of the present invention is a carbon dioxide reduction device comprising a first electrode; at least any one of an electrolyte solution and an ion conducting membrane; and a second electrode, wherein the first electrode is a porous electrode having a porous carbon, and the porous carbon has at least one type of metal-nonmetal element bond represented by M-R, in which M represents a metal element of Groups 4 to 15, and R represents a nonmetal element of Groups 14 to 16.

7 Claims, 1 Drawing Sheet

(56) References Cited

OTHER PUBLICATIONS

Ana Sofia Varela et al., "Metal-Doped Nitrogenated Carbon as an Efficient Catalyst for Direct $CO_2$ Electroreduction to CO and Hydrocarbons", Angewanate Communications, vol. 54, pp. 10758-10762, 2015, cited in CA.

Haiyan Yu et al., "Cu,N-codoped Hierarchical Porous Carbons as Electrocatalysts for Oxygen Reduction Reaction", ACS Applied Materials & Interfaces, vol. 8, pp. 21431-21439, 2016, cited in CA.

Extended European Search Report issued May 10, 2021 in corresponding European Patent Application No. 18862588.3.

Perez-Cadenas et al., "Metal-doped carbon xerogels for the electrocatalytic conversion of $CO_2$ to hydrocarbons", Carbon, 2013, vol. 56, pp. 324-331, 8 pages.

Shibata et al., "Simultaneous reduction of carbon dioxide and nitrate ions at gas-diffusion electrodes with various metallophthalocyanine catalysts", Electrochimica Acta, 2003, vol. 48, pp. 3953-3958, 6 pages.

Su et al., "Nickel-Nitrogen-Modified Graphene: An Efficient Electrocatalyst for the Reduction of Carbon Dioxide to Carbon Monoxide", Small, 2016, vol. 12, No. 44, pp. 6083-6089, 7 pages.

Ogihara et al., "Electrochemical Reduction of $CO_2$ to CO by a Co—N—C Electrocatalyst and PEM Reactor at Ambient Conditions", Chemistry Select Communication, 2016, vol. 1, pp. 5533-5537.

Wu et al., "A metal-free electrocatalyst for carbon dioxide reduction to multi-carbon hydrocarbons and oxygenates", Nature Communications, 2016, vol. 7, Article No. 13869, 6 pages.

Kutz et al., "Sustainion Imidazolium-Functionalized Polymers for Carbon Dioxide Electrolysis", Energy Technology, 2017, vol. 5, pp. 929-936.

Bagger et al, Single site porphyrine-like structures advantages over metals for selective electrochemical CO2 reduction, Catalysis Today, vol. 288, Jun. 2017, pp. 74-78 (Year: 2017).

Tripkovic et al, Electrochemical CO2 and CO Reduction on Metal-Functionalized Porphyrin-like Graphene, Journal of Physical Chemistry C, vol. 117, No. 18, Apr. 2013, pp. 9187-9195 (Year: 2013).

Ju et al, Understanding activity and selectively of metal-nitrogen-doped carbon catalysts for electrochemical reduction of CO2, Nature Communications, vol. 8, No. 944, Oct. 2017, pp. 1-9 (Year: 2017).

Hu et al, Enhanced Catalytic Activity of Cobalt Porphyrin in CO2 Electroreduction upon Immobilization on Carbon Materials, Angewandte Chemie, vol. 56, No. 23, May 2017, pp. 6468-6472 (Year: 2017).

Yang et al, Electrochemistry of Carbon Dioxide on Carbon Electrodes, ACS Applied Materials & Interfaces, vol. 8, No. 42, Dec. 2015, pp. 28357-28371 (Year: 2015).

Tanaka et al, Aminopyridyl cation radical method for bridging between metal complex and glassy carbon: cobalt(II) tetraphenylporphyrin bonded on glassy carbon for enhancement of CO2 electroreduction, Journal of Electroanalytical Chemistry, vol. 437, No. 1-2, Nov. 1997, pp. 29-35 (Year: 1997).

Yu et al, Supporting Information for Cu, N-codoped Hierarchical Porous Carbons as Electrocatalyst for Oxygen Reduction Reaction, ACS Applied Materials & Interfaces, vol. 8, No. 33, Aug. 2016, pp. S-1 to S-8 (Year: 2016).

Zhu et al, Surface and Interface Engineering of Noble-Metal-Free Electrocatalysts for Efficient Energy Conversion Processes, ACS Accounts of Chemical Research, vol. 50, No. 4, Feb. 2017, pp. 915-923 (Year: 2017).

Zhang et al, Bismuth Single Atoms Resulting from Transformation of Metal-Organic Frameworks and Their Use as Electrocatalysts for CO2 Reduction, Journal of the American Chemical Society, vol. 141, No. 42, Oct. 2019, pp. 16569-16573 (Year: 2019).

Zhao et al, Tunable and Efficient Tin Modified Nitrogen-Doped Carbon Nanofibers for Electrochemical Reduction of Aqueous Carbon Dioxide, Advanced Energy Materials, vol. 8, No. 10, Jan. 2018, pp. 170 (Year: 2018).

Jeon et al, Antimony-doped graphene nanoplatelets, Nature Communications, vol. 6, May 2015, Article No. 7123, pp. 1-8 (Year: 2015).

\* cited by examiner

CARBON DIOXIDE REDUCTION DEVICE, AND POROUS ELECTRODE

TECHNICAL FIELD

The present invention relates to a carbon dioxide reduction device and a porous electrode which can be suitably used for the carbon dioxide reduction device.

BACKGROUND ART

A carbon dioxide reduction device which electrically reduces carbon dioxide to produce valuable chemicals has attracted attention as a technique for decreasing the amount of $CO_2$ emission and storing natural energy, and has been researched and developed. Carbon dioxide reduction requires development of catalysts suitable therefor, and metals, alloys, metal carbon compounds, carbon compounds and the like have been reported (see PTLs 1 to 3 and NPL 1).

Further, NPL 2 discloses an electrode material in which a catalyst is supported by a binder on a porous material capable of diffusing carbon dioxide gas, for electrolytically reducing carbon dioxide with high efficiency. Further, NPL 3 discloses a cathode in which a carbon catalyst comprising Co—N—C is supported on a carbon porous material.

CITATION LIST

Patent Literature

PTL 1: JP 5376381 B2
PTL 2: JP 2003-213472 A
PTL 3: JP 5017499 B2

Non Patent Literature

NPL 1: Nature Communications 7, Article number: 13869 (2016)
NPL 2: Energy Technol. 2017, 5, 929-936
NPL 3: Chemistry Select 2016, 1, 5533-5537

SUMMARY OF INVENTION

Technical Problem

However, such an electrode material in which a catalyst is supported by a binder on a porous material, as disclosed in NPL 2, has insufficient durability since the catalyst and the porous material are not firmly bonded. Further, it is necessary to produce a porous material once and then attach a catalyst thereto, resulting in a complicated production process. Likewise, also in NPL 3, the catalyst is supported on the carbon porous material, resulting in insufficient durability.

Accordingly, a carbon dioxide reduction device capable of improving the reduction efficiency and the durability without complicating the production process is necessary for practical application of the carbon dioxide reduction device.

The present invention has been devised in view of the problems described above, and an object of the present invention is to provide a carbon dioxide reduction device capable of improving both the reduction efficiency and the durability without complicating the production process, and a porous electrode therefor.

Solution to Problem

As a result of diligent studies, the present inventor has found that the aforementioned problems can be solved by using a porous carbon having a bond of a specific metal and a specific nonmetal element as an electrode, thereby accomplishing the present invention described below. That is, the present invention provides (1) to (11) below.

(1) A carbon dioxide reduction device comprising: a first electrode; at least any one of an electrolyte solution and an ion conducting membrane; and a second electrode, wherein the first electrode is a porous electrode comprising a porous carbon, and the porous carbon comprises at least one type of metal-nonmetal element bond represented by M-R, in which M represents a metal element of Groups 4 to 15, and R represents a nonmetal element of Groups 14 to 16.

(2) The carbon dioxide reduction device according to (1) above, wherein the M is at least one selected from the group consisting of Sb, Bi, Sn, and Pb, and the R is C or N.

(3) The carbon dioxide reduction device according to (1) above, wherein the M is at least one selected from the group consisting of Mn, Fe, Ni, Ru, Co, Rh, Cu, Zn, Nb, Mo, In, and Ag, and the R is at least one selected from the group consisting of C, N, S, and O.

(4) The carbon dioxide reduction device according to any one of (1) to (3) above, wherein the porous electrode comprises only C, R, and M as its constituent elements.

(5) The carbon dioxide reduction device according to any one of (1) to (4) above, wherein the M-R is chemically bonded to the porous electrode.

(6) The carbon dioxide reduction device according to any one of (1) to (5) above, wherein porosity of the porous electrode is 10 to 90%.

(7) A porous electrode comprising: a porous carbon, wherein the porous carbon comprises at least one type of metal-nonmetal element bond represented by M-R, in which M represents a metal element of Groups 4 to 15, and R represents a nonmetal element of Groups 14 to 16).

(8) The method for producing a porous electrode according to (7) above, comprising: heating a composition for porous electrode comprising a porous precursor polymer and a metal complex to obtain a porous electrode.

(9) The method for producing a porous electrode according to (7) above, comprising: applying a metal complex or a metal ion and an organic compound having R onto a non-woven carbon fabric, followed by heating to obtain the porous electrode.

(10) The method for producing a porous electrode according to (9) above, wherein the metal complex comprises at least one selected from the group consisting of triphenyl complexes, porphyrin complexes, phthalocyanine complexes, and dithiolene complexes.

(11) The method for producing a porous electrode according to (9) or (10) above, wherein the metal ion comprises at least one selected from the group consisting of nitrate ion, sulfate ion, chloride ion, bromide ion, iodide ion, and hydroxide ion, and the organic compound comprising R comprises at least one selected from poly(4-vinylpyridine), polyanilines, polythiophenes, bipyridine derivatives, imidazole derivatives, and pyrazole derivatives.

Advantageous Effects of Invention

The present invention provides a carbon dioxide reduction device capable of improving both the reduction efficiency and the durability without complicating the production process, and a porous electrode therefor.

DESCRIPTION OF EMBODIMENTS

The present invention will be described below further in detail with reference to embodiments.

[Porous Electrode (First Electrode)]

The porous electrode of the present invention is used as one electrode (first electrode) for a carbon dioxide reduction device and constitutes a cathode therein.

The porous electrode is composed of a porous carbon, and the porous carbon has a metal-nonmetal element bond represented by M-R, wherein M represents a metal element of Groups 4 to 15, and R represents a nonmetal element of Groups 14 to 16. Here, the metal element represented by M serves as a catalytic active site which causes a reduction reaction. Further, the nonmetal element represented by R is generally carbon element constituting the porous carbon, or a nonmetal element of Groups 14 to 16, other than the carbon element, linked to the carbon element constituting the porous carbon via a covalent bond.

In the porous electrode of the present invention, the metal element is bonded to the porous carbon and thus is appropriately dispersed, thereby enabling the reduction reaction to be performed with high efficiency. Further, the porous carbon has a structure in which the metal element is chemically bonded to the nonmetal element represented by R via a covalent bond, an ionic bond, or the like, and thus the catalyst (metal element) is firmly bonded to the porous carbon, thereby enhancing the durability.

Examples of M include V, Cr, Mn, Fe, Co, Ni, Cu, Zn, Sn, Zr, Nb, Mo, Ru, Rh, Pd, Ag, Cd, Hf, Ta, W, Re, Ir, Pt, Au, Hg, Al, Si, In, Sn, Tl, Pb, Bi, Sb, and Te. Among these, specific preferable examples of the metal element include Sb, Bi, In, Sn, Pb, Mn, Fe, Ni, Ru, Co, Rh, Cu, Zn, Nb, Mo, and Ag. Among these, Sb, Bi, Mn, Fe, Ni, Ru, Co, Cu, Nb, Mo, and Ag are more preferable, and Bi, Sb, Ni, Co, Ru, Ag, and Pb are particularly preferable. Further, the nonmetal element represented by R is preferably any one of C, N, S, and C, more preferably any one of C, N, and S.

Further, in the case where the metal element represented by M is Sb, Bi, Sn, and Pb, the nonmetal element represented by R is preferably C. Further, in the case where the metal element represented by M is Sb, Bi, Sn, and Pb, the nonmetal element represented by R is also preferably N. These metal elements can be bonded to carbon element or a nitrogen atom via a covalent bond, and such combinations enable the metal elements to be firmly bonded to the porous carbon.

From the same point of view, in the case where the metal element represented by M is Ni, Ru, Co, Rh, Cu, and Ag, the nonmetal element represented by R is preferably any one of C, N, S, and C, more preferably any one of C, N, and S. Likewise, in the case where the metal element represented by M is Mn, Fe, Zn, In, Nb, or Mo, the nonmetal element represented by R is preferably any one of C, N, S, and C, more preferably any one of C, N, and S.

That is, the metal-nonmetal element bond represented by M-R is preferably any one of Sb—C, Bi—C, Sn—C, Pb—C, Ni—C, Ru—C, Co—C, Rh—C, Cu—C, Ag—C, In—N, Pb—N, Sb—N, Bi—N, Ni—N, Ru—N, Co—N, Rh—N, Cu—N, Ag—N, Ni—S, Ru—S, Co—S, Rh—S, Cu—S, Ag—S, Ni—O, Ru—C, Co—O, Rh—O, Cu—O, and Ag—O, more preferably any one of Bi—C, Sb—C, Ni—C, Co—C, Ru—C, Ag—N, Co—N, Ni—S, Co—S, Pb—N, and Sb—N. Likewise, specific examples thereof also preferably include Mn—C, Fe—C, Zn—C, Nb—C, Mo—C, Mn—N, Fe—N, Zn—N, Nb—N, Mo—N, Mn—S, Fe—S, Zn—S, Nb—S, Mo—S, Mn—O, Fe—C, Zn—O, Nb—C, and Mo—C.

Further, in view of the reduction efficiency, Sb—C, Co—C, Ag—N, Co—N, Ni—S, Mn—N, Fe—N, Co—N, Ni—N, Co—S, Mo—N, Nb—N, Ni—C, Pb—N, and Sb—N are further preferable.

The bonding state thereof in the porous electrode can be measured, for example, by photoelectron spectroscopy (XPS). In general, the electronic state (electron energy) in an element varies (chemically shifts) depending on the bonding state thereof, and therefore the bonding state of a compound comprised in the measurement target can be investigated by analyzing the electron energy of each element using XPS.

Further, the porous electrode of the present invention preferably comprises only C, R, and M as its constituent elements. When the constituent elements consist only of these elements, the reduction efficiency in the first electrode can be more enhanced. The element "C" herein means carbon element derived from the porous carbon.

In the porous carbon, for the metal element represented by M and the nonmetal element represented by R, one type thereof may be used alone, respectively, or two or more types of them may be used in combination, respectively. Accordingly, the porous carbon may comprise one single type of metal-nonmetal element bond or may comprises two or more types of metal-nonmetal element bonds.

The content of the metal element represented by M in the porous electrode is not specifically limited, but is, for example, 0.01 to 50 mass %, preferably 0.1 to 50 mass %, more preferably 0.5 to 20 mass %.

Further, the porosity of the porous electrode is preferably 10 to 90%, more preferably 20 to 70%, further preferably 30 to 70%. Further, the porosity is furthermore preferably 60% or less. Adjusting the porosity to such a range enables an appropriate amount of metal elements to be bonded to the porous carbon, thereby enabling carbon dioxide reduction to be performed with high efficiency.

The porous electrode of the present invention has the aforementioned porosity and is composed of a porous carbon having sufficient electrical conductivity, thereby serving as a gas diffusion electrode. Further, the porous electrode of the present invention (that is, the gas diffusion electrode) is composed of a porous carbon having a M-R bond, as described above, so that M-R is chemically bonded to the porous electrode. With such a configuration, the porous electrode enables appropriate diffusion of carbon dioxide in the electrode and reduction of carbon dioxide with high efficiency, while enhancing the durability.

[Method for Producing a Porous Electrode (1)]

The porous electrode of the present invention can be obtained by heating a composition for porous electrode comprising a porous precursor polymer and a metal complex. Since the M-R bond of the present invention is formed by heating in the same step as formation of the porous carbon, the porous electrode can be obtained without complicating the production method.

The heating temperature in this production method is, for example, a high temperature of 300° C. or more, preferably 350 to 1500° C. or more, more preferably 500 to 1300° C., further preferably 600 to 1100° C. When the heating temperature falls within such a range, the metal element M can be chemically bonded to the carbon element constituting the porous carbon or nitrogen element, sulfur element, oxygen element, or the like, which is covalently bonded to the carbon element, while the porous precursor polymer is carbonized to form the porous carbon. Further, the heating may be performed in an inert gas atmosphere such as nitrogen and helium.

The porous precursor polymer may be an organic polymer which can be carbonized by heating so as to form the porous carbon, but examples thereof include polyamide-imide or a precursor thereof, polyetherimide, polyacrylonitrile, polyamino acid, poly[3-cyanomethyl-1-vinylimidazolium] bis(trifluoromethanesulfonyl)imide] (PCMVIMTf2N), poly(meth)acrylic acid, a polyacrylonitrile-polystyrene copolymer, cellulose, and lignin. One type of these may be used alone, or two or more types of them may be mixed for use.

Among these, PCMVIMTf2N is preferable. In the case of using PCMVIMTf2N, poly(meth)acrylic acid, particularly, polyacrylic acid is preferably used in combination. Further, as a porous precursor polymer, one or both of polyamide-imide and a precursor thereof are preferably used in combination with polyetherimide.

Further, in order to form desired voids in the porous carbon, such fillers or the like that can be removed after the heating may be further added to the composition for porous electrode. Further, such polymers that disappear by the heating may be comprised in the composition as the porous precursor polymer. The disappearance of such a polymer by the heating facilitates the formation of voids in the porous carbon.

The metal complex is a catalyst precursor, and a complex of the metal element M may be used therefor. Specific examples of the metal complex preferably include triphenyl complexes, metallocenes, porphyrin complexes, phthalocyanine complexes, pyridine complexes, diimine complexes, triimine complexes, picolinates, and dithiolene complexes such as dithiobenzyl complex and benzenedithiolate complex of various metals. Specific examples thereof include organic metal compounds such as triphenyl bismuthine (TPB), triphenylantimony, nickelocene, dicarbonyl cyclopentadienyl cobalt(I), ruthenocene, cobalt(II) tetraphenylporphyrin, silver(II) picolinate, and bis(dithiobenzil) nickel(II). Further, examples thereof also include nickel(II) tetraphenylporphyrin and copper(II) tetraphenylporphyrin.

In the composition for porous electrode, the amount of the metal complexes to be mixed is preferably 1 to 50 parts by mass, more preferably 2 to 20 parts by mass, further preferably 5 to 15 parts by mass, relative to 100 parts by mass of the porous precursor polymer. One type of the metal complexes may be used alone, or two or more types of them may be used in combination.

In this production method, R in the metal-nonmetal element bond (M-R) can be N or S in the case where the metal complex is a porphyrin complex such as cobalt(II) tetraphenylporphyrin, silver(II) picolinate, bis(dithiobenzil)nickel (II), or the like, so that the metal complex comprises nitrogen or sulfur element. Further, use of a porous precursor polymer comprising nitrogen element or sulfur element may allow R in the metal-nonmetal element bond (M-R) to be N or S.

Further, in this production method, the composition for porous electrode may comprise components other than the catalyst precursor and the metal complex. Examples of such components include chalcogen compounds and carbon materials such as carbon nanotube and graphene, or the like. Examples of the chalcogen compounds include those having sulfur element, specifically, amino acids having sulfur element such as cysteine and methionine, or the like. Use of such chalcogen compounds enables a partial structure which can interact with carbon dioxide to be formed and reduction reaction to be performed efficiently.

The composition for porous electrode is preferably used as a dispersion by dispersing the aforementioned components in an organic solvent. Examples of the organic solvent include ester-based solvents, ketone-based solvents, ether-based solvents, alcohol-based solvents, glycol ethers, amide-based solvents, nitrile-based solvents, carbonate-based solvents, halogenated hydrocarbons, hydrocarbons, sulfone-based solvents, sulfoxides, formamide, or the like. Specific examples preferably include aprotic solvents such as DMF (N,N-dimethylformamide), DMSO (dimethylsulfoxide), and γ-butyrolactone, or the like. The concentration of the composition for porous electrode is not specifically limited, but may be, for example, 0.5 to 40 mass %, preferably about 1 to 20 mass %.

The dispersion is applied to a substrate such as a glass plate, dried by heating as required, and thereafter separated from the substrate to obtain the composition for porous electrode in the form of a thin film. The drying temperature is, for example, about 25 to 120° C. The composition for porous electrode in the form of a thin film may be heated, for example, at a high temperature of 300° C. or more, as described above, to obtain the porous electrode of the present invention.

[Method for Producing a Porous Electrode (2)]

Alternatively, the porous electrode of the present invention can be produced also by preparing a non-woven carbon fabric composed of a porous carbon in advance, applying a metal complex, or a metal ion and an organic compound comprising R onto the non-woven carbon fabric, and thereafter applying necessary and sufficient energy to chemically bond M-R to the non-woven carbon fabric.

Examples of the method for applying the energy include heating and electromagnetic radiation, or the like. Among these, heating is preferable. The heating temperature in this production method is, for example, a high temperature of 200° C. or more, preferably 200 to 1000° C., more preferably 250 to 900° C., further preferably 300 to 800° C., furthermore preferably 400 to 800° C. When the heating temperature falls within such a range, the metal element M can be chemically bonded to the carbon element constituting the porous carbon or nitrogen element, sulfur element, oxygen element, or the like, which is covalently bonded to the carbon element. Further, the heating may be performed in an inert gas atmosphere such as nitrogen and helium.

The metal complex which may be used in the production method (2) may be appropriately selected from those listed in the production method (1). Preferable examples of the metal complex in the production method (2) include triphenyl complexes, porphyrin complexes, phthalocyanine complexes, and dithiolene complexes of various metals, more preferably porphyrin complexes and dithiolene complexes thereof. Also in the production method (2), one type of the metal complexes may be used alone, or two or more types of them may be used in combination.

The aforementioned metal ion is not specifically limited, but examples thereof include a nitrate ion, a sulfate ion, a chloride ion, a bromide ion, an iodide ion, and a hydroxide ion. Among these, a nitrate ion and a chloride ion are preferable. The metal of the metal ion is represented by M as described above. One type of these may be used alone, or two or more type of them may be used in combination.

The organic compound comprising R is not specifically limited, and examples thereof include polymers having a heteroatom, aromatic polymers, heterocyclic compounds, amine derivatives, and thiol derivatives. The heteroatom is N, S, or O, preferably N or S. Specific examples of the polymers having a heteroatom include polymers having a complex aromatic ring such as poly(4-vinylpyridine), (P4VP) and polythiophenes, and polymers having an aromatic ring such as polyanilines and poly(triarylamine), or the like. Among these, poly(4-vinylpyridine), polyanilines, and polythiophenes are preferable, and poly(4-vinylpyridine) and polythiophenes are further preferable. Examples of the aromatic polymers include polystyrene.

Examples of the heterocyclic compounds include pyridine derivatives, bipyridine derivatives, terpyridine derivatives, pyrazole derivatives, imidazole derivatives, pyrazole derivatives, triazole derivatives, thiophene derivatives, bithiophene derivatives, and terthiophene derivatives. Among these, bipyridine derivatives, imidazole derivatives, terpyridine derivatives, and pyrazole derivatives are preferable, bipyridine derivatives, imidazole derivatives, and pyrazole derivatives are further preferable, and bipyridine derivatives and imidazole derivatives are particularly preferable.

The imidazole derivatives include imidazole and imidazole compounds in which imidazole is substituted with a substituent, such as alkyl-substituted imidazoles, typified by 1,2-dimethylimidazole. The bipyridine derivatives also include bipyridine and bipyridine compounds in which bipyridine is substituted with a substituent, such as alkyl-substituted bipyridines, and the same applies to other derivatives.

One types of the organic compounds comprising R may be used alone, or two or more types of them may be used in combination.

The non-woven carbon fabric is not specifically limited, and known non-woven carbon fabrics may be used. For example, products commercially available as non-woven carbon fabrics for fuel cells may be used, and examples thereof include "TORAYCA" ® carbon paper, available from Toray Industries, Inc., "AvCarb 1071HCB", available from New Metals and Chemicals Corporation, and BC Series, available from SGL Carbon AG.

Further, the non-woven carbon fabric can be obtained by firing a precursor polymer. Examples of the precursor polymer include polyamide-imide or a precursor thereof, polyetherimide, polyacrylonitrile, polyamino acid, poly[3-cyanomethyl-1-vinylimidazolium]bis(trifluoromethane-sulfonyl)imide](PCMVIMTf2N), poly(meth)acrylic acid, polyacrylonitrile-polystyrene copolymer, cellulose, and lignin, or the like.

The method for applying the metal complex, or the metal ion and the organic compound comprising R is not specifically limited, and these may be dispersed in an organic solvent and applied to the non-woven carbon fabric. The organic solvent is not specifically limited, and may be appropriately selected from those mentioned above.

Further, the metal complex, or the metal ion and the organic compound comprising R may be applied to the non-woven carbon fabric together with an electrically conductive carbon material such as carbon blacks, or the like. More specifically, an electrically conductive carbon material such as carbon blacks to which the metal complex, or the metal ion and the organic compound comprising R are attached may be applied to the non-woven carbon fabric. In such a case, a dispersion containing the electrically conductive carbon material such as carbon blacks to which the metal complex, or the metal ion and the organic compound comprising R are attached may be applied to the non-woven carbon fabric.

Various carbon materials having electrical conductivity may be used as the electrically conductive carbon material, and examples thereof include carbon blacks such as mesoporous carbon, activated carbon, Ketjenblack, and acetylene black, graphites, carbon fibers, graphenes, carbon nanotubes, or the like. Among them, carbon blacks are particularly preferable.

[Carbon Dioxide Reduction Device]

The carbon dioxide reduction device of the present invention includes a first electrode (cathode), at least any one of an ion conducting membrane and an electrolyte solution, and a second electrode (anode), wherein the aforementioned porous electrode is used as the first electrode.

The carbon dioxide reduction device of the present invention is such a device that is configured to reduce carbon dioxide in the first electrode. In the second electrode, oxidation reaction for any substance may be carried out, but oxidation reaction for water is preferably carried out.

In the carbon dioxide reduction device of the present invention, cations are generated in the second electrode. The cations generated are supplied to the first electrode side via at least any one of the ion conducting membrane and the electrolyte solution. The cations are preferably protons.

Further, anions are generated in the first electrode in the carbon dioxide reduction device. The anions generated in the first electrode are supplied to the second electrode side via at least any one of the ion conducting membrane and the electrolyte solution. The anions are preferably hydroxide ions.

Either cations or anions may be generated, or both may be generated. Further, it is preferable that cations are generated in the second electrode and supplied to the first electrode side.

A carbon dioxide reduction device according to one embodiment of the present invention includes first and second electrodes and an ion conducting membrane, wherein the first and second electrodes are respectively arranged on both sides of the ion conducting membrane, and these are bonded together to form a membrane-electrode assembly.

Figure 1:
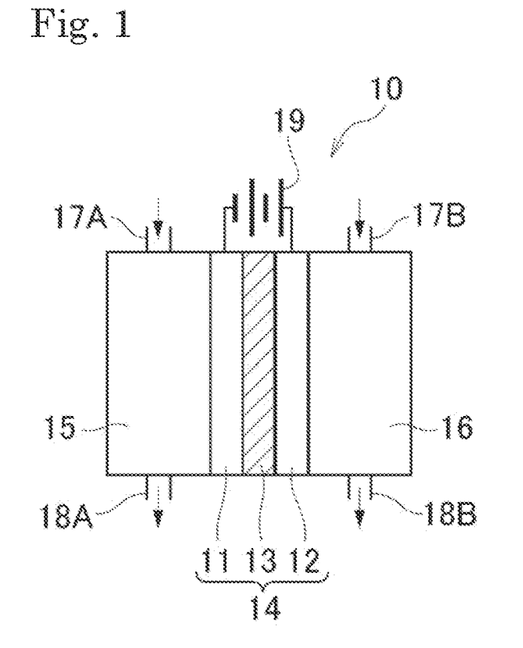
FIG. 1 is a schematic diagram showing one embodiment of a carbon dioxide reduction device of the present invention.

FIG. 1 schematically shows a specific example using such a membrane-electrode assembly. As shown in FIG. 1, a carbon dioxide reduction device 10 comprises a membrane-electrode assembly 14 including a first electrode 11, a second electrode 12, and an ion conducting membrane 13. In the carbon dioxide reduction device 10, a cell is partitioned by the membrane-electrode assembly 14, to form a cathode compartment 15 and an anode compartment 16. In this way, the carbon dioxide reduction device 10 has a two-compartment diaphragm type cell partitioned by the membrane-electrode assembly 14 into two compartments.

The cathode compartment 15 is provided with a first inlet port 17A through which carbon dioxide is introduced, a first outlet port 18A through which a substance generated by reduction such as carbon monoxide is discharged, and the like. Further, the anode compartment 16 is provided with a second inlet port 17B through which a substance to be oxidized such as water or an inert gas, which will be described below, is introduced, a second outlet port 18B through which a substance generated by oxidation such as oxygen is discharged, and the like.

A power source 19 is connected to the first and second electrodes 11 and 12 to apply a voltage between the first and second electrodes 11 and 12. Carbon dioxide is introduced into the cathode compartment 15 through the first inlet port 17A, and the carbon dioxide is reduced in the first electrode 11 to generate a product. Examples of the product include CO (carbon monoxide), $HCO^{3-}$, $OH^-$, $HCO^-$, $H_2CO$, $(HCO_2)^-$, $H_2CO_2$, $CH_3OH$, $CH_4$, $C_2H_4$, $CH_3CH_2OH$, $CH_2COO^-$, $CH_3COOH$, $C_2H_6$, $O_2$, $(COOH)_2$, and $(COO^-)_2$. Carbon monoxide is preferably generated. Gaseous carbon dioxide may be brought into contact with the first electrode 11 without filling water or the like into the cathode compartment 15. Alternatively, carbon dioxide may be brought into contact with the first electrode 11 in water by filling water into the cathode compartment 15 and introducing carbon dioxide into the water. Alternatively, gaseous carbon dioxide containing moisture may be brought into contact with the first electrode 11.

Hydrogen, water, or an aqueous solution containing hydroxide ions or hydrogen is filled or introduced into the anode compartment 16, and the oxidation reaction is performed in the second electrode 12. An inert gas such as helium may be appropriately blown into the water or aqueous solution filled in the anode compartment 16.

However, gaseous carbon dioxide is preferably introduced into the cathode compartment 15 and brought into contact with the first electrode 11. Further, water is preferably filled into the anode compartment 16.

Figure 2:
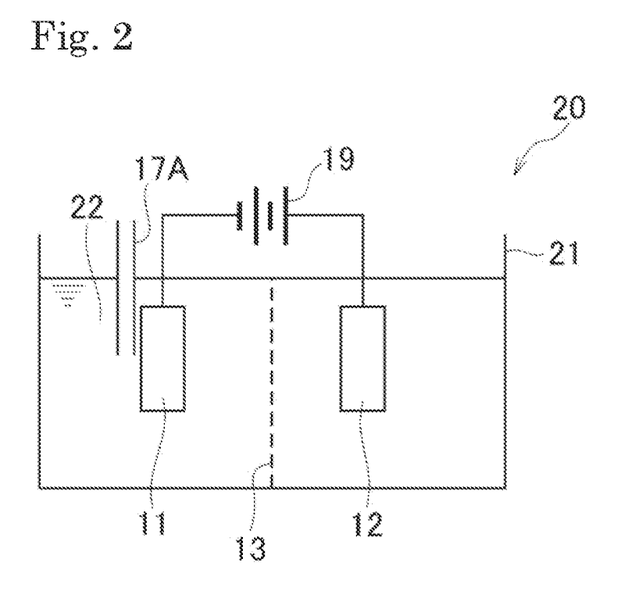
FIG. 2 is a schematic diagram showing another embodiment of the carbon dioxide reduction device of the present invention.

On the other hand, a carbon dioxide reduction device according to another embodiment of the present invention is a device in which an electrolyte solution is used. FIG. 2 schematically shows a specific example of such a carbon dioxide reduction device 20 using an electrolyte solution. As shown in FIG. 2, the carbon dioxide reduction device 20 has an electrolytic cell 21 filled with an electrolyte solution 22, and the first and second electrodes 11 and 12 arranged in the electrolyte solution 22. However, the first and second electrodes 11 and 12 need only to be in contact with the electrolyte solution 22 and is not necessarily arranged inside the electrolyte solution 22.

Further, the ion conducting membrane 13 is arranged inside the electrolytic cell 21, and the electrolyte solution 22 is partitioned by the ion conducting membrane 13 into a region on the first electrode 11 side and a region on the second electrode 12 side. Further, the carbon dioxide reduction device 20 is provided with the first inlet port 17A, and one end of the inlet port 17A is arranged inside the electrolyte solution 22 in the region on the first electrode 11 side. Further, the carbon dioxide reduction device 20 may be provided with a reference electrode or the like arranged in the electrolyte solution 22 in the region on the first electrode 11 side. A voltage is applied between the first and second electrodes 11 and 12 by the power source 19.

Also in the carbon dioxide reduction device 20 using an electrolyte solution, as described above, carbon dioxide introduced through the first inlet port 17A is reduced in the first electrode 11, to generate carbon monoxide or the like. Further, water, hydroxide ion, hydrogen, or other substances in the electrolyte solution 22 may be oxidized in the second electrode 12. Gases such as hydrogen may be blown into the electrolyte solution 22 on the second electrode 12 side through a second inlet port, which is not illustrated.

The carbon dioxide reduction devices 10 and 20 only show examples of the carbon dioxide reduction device, and the carbon dioxide reduction device of the present invention is not limited to the aforementioned configurations. For example, the ion conducting membrane may be omitted in the carbon dioxide reduction device 20 using the electrolyte solution. Further, the voltage may be applied, for example, by the photovoltaic power.

[Ion Conducting Membrane]

The ion conducting membrane used for the carbon dioxide reduction device of the present invention is a solid film, and examples thereof include cation conducting membranes capable of transporting cations such as protons and anion conducting membranes capable of transporting anions.

Examples of the cation conducting membranes preferably include hydrocarbon resin-based polysulfonic acids and carboxylic acids such as polyethylene sulfonic acid, fullerene-crosslinked polysulfonic acid, and polyacrylic acid, and fluororesin-based sulfonic acids and carboxylic acids such as perfluoroethylene sulfonic acid. Further, phosphate glasses such as $SiO_2$—$P_2O_5$, heteropolyacids such as silicotungstic acid and phosphotungstic acid, and ceramics such as perovskite oxides can also be used therefor.

Further, examples of the anion conducting membranes preferably include resins and polyethers having a quaternary ammonium salt such as poly(styrylmethyltrimethylammonium chloride).

Among the aforementioned examples, cation conducting membranes are preferable. Among them, perfluoroethylene sulfonic acid resin is preferable. Examples of the commercially available products of the perfluoroethylene sulfonic acid resin include Nafion (trademark of DuPont).

[Second Electrode]

The second electrode may be any electrode capable of causing an oxidation reaction. For example, materials containing one or more selected from the group consisting of various metals, metal compounds, and electrically conductive carbon materials can be used.

Examples of the metals used for the second electrode include iron, gold, copper, nickel, platinum, palladium, ruthenium, osmium, cobalt, rhodium, iridium, or the like. As the metal compounds, metal compounds of these metals including inorganic metal compounds and organic metal compounds can be used. Specifically, examples thereof include metal halides, metal oxides, metal hydroxides, metal nitrates, metal sulfates, metal acetates, metal phosphates, metal carbonyls, and metal acetylacetonates.

Further, as the electrically conductive carbon materials, various carbon materials having electrical conductivity can be used. Examples thereof include carbon blacks such as mesoporous carbon, activated carbon, Ketjenblack, and acetylene black, graphites, carbon fibers, carbon papers, carbon whiskers, or the like.

Further, the second electrode is preferably a composite formed by mixing at least any one of the metals and the metal compounds with an electrically conductive carbon material. In the composite, it is more preferable to use at least a metal. Further, examples of the composite include composite membranes. Such a composite membrane can be formed by dispersing a mixture of a metal or a metal compound with an electrically conductive carbon material in a solvent and applying the solvent onto a substrate or the like, followed by heating. At such a case, the substrate to be used may be an electrically conductive carbon material such as carbon papers.

Further, fluorine-containing compounds such as polytetrafluoroethylene (PTFE), tetrafluoroethylene oligomer (TFEO), graphite fluoride ($(CF)n$), and fluoride pitch (FP), and Nafion (perfluorocarbon sulfonic acid polymer) may be mixed with the second electrode. These are used as a water repellent agent to improve the electrochemical reaction efficiency.

Further, the aforementioned fluorine-containing compounds may be used also as a binder when forming the second electrode. Accordingly, when forming the aforementioned composite, the fluorine-containing compounds may be further mixed with the electrically conductive carbon material and at least any one of the metal and the metal compound.

[Electrolyte Solution]

The electrolyte solution used for the carbon dioxide reduction device of the present invention is a solution which can transport anions and cations. As the electrolyte solution, conventionally known electrolyte solutions may be used. Examples thereof include a sodium bicarbonate aqueous solution, a sodium sulfate aqueous solution, a potassium chloride aqueous solution, a sodium chloride aqueous solution, a sodium hydroxide aqueous solution, or the like.

EXAMPLES

The present invention will be described further in detail by referring to Examples, but the scope of the present invention is not limited by these examples at all.

Example 1

0.1 g of triphenylbismuthine (TPB), 1 g of poly[3-cyanomethyl-1-vinylimidazolium] bis(trifluoromethanesulfonyl)imide], and 0.1 g of polyacrylic acid were dispersed in DMF to prepare a composition for porous electrode (metal content in solid content: 4.0 mass %) in the form of dispersion solution. The composition for porous electrode was casted onto a glass plate, dried at 400° C. for 8 hours, and thereafter peeling the sheet from the glass plate to obtain a polymer membrane. This was heated at 800° C. under a nitrogen atmosphere to obtain a porous carbon (first electrode) comprising a Bi—C bond. The porous carbon was subjected to analysis of electron energy of each element by XPS, to evaluate the bonding state of compounds contained in the porous carbon.

Subsequently, 30 mg of platinum nanoparticles (available from Sigma-Aldrich Co. LLC.), 10 mg of mesoporous carbon (available from Sigma-Aldrich Co. LLC.), and 3 mg of PTFE were dispersed in 0.5 ml of isopropanol, and the dispersion was applied onto carbon paper and heated at 300° C. for 1 hour to obtain a second electrode. The first electrode and second electrode obtained were laminated with an ion conducting membrane made of Nafion®, and the laminate was hot-pressed at 59 MPa and 413 K, to fabricate a membrane-electrode assembly. The membrane-electrode assembly was set at the center of a two-compartment diaphragm type cell having spaces for a cathode compartment and an anode compartment, to construct a carbon dioxide reduction device.

Example 2

The same operation as in Example 1 was performed, except that a composition for porous electrode (metal content in solid content: 2.9 mass %) was prepared using triphenylantimony instead of TPB to obtain a porous carbon comprising a Sb—C bond as a first electrode.

Example 3

The same operation as in Example 1 was performed, except that a composition for porous electrode (metal content in solid content: 2.6 mass %) was prepared using nickelocene instead of TPB to obtain a porous carbon comprising a Ni—C bond.

Example 4

The same operation as in Example 1 was performed, except that a composition for porous electrode (metal content in solid content: 2.7 mass %) was prepared using dicarbonyl cyclopentadienyl cobalt(I) instead of TPB to obtain a porous carbon comprising a Co—C bond as a first electrode.

Example 5

The same operation as in Example 1 was performed, except that a composition for porous electrode (metal content in solid content: 3.6 mass %) was prepared using ruthenocene instead of TPB to obtain a porous carbon comprising a Ru—C bond as a first electrode.

Example 6

The same operation as in Example 1 was performed, except that a composition for porous electrode (metal content in solid content: 2.6 mass %) was prepared using silver(II) picolinate instead of TPB to obtain a porous carbon comprising an Ag—N bond as a first electrode.

Example 7

The same operation as in Example 1 was performed, except that a composition for porous electrode (metal content in solid content: 0.7 mass %) was prepared using cobalt(II) tetraphenylporphyrin instead of TPB to obtain a porous carbon comprising a Co—N bond.

Example 8

The same operation as in Example 1 was performed except that a composition for porous electrode (metal content in solid content: 0.9 mass %) was prepared using bis(dithiobenzil)nickel(II) instead of TPB to obtain a porous carbon comprising a Ni—S bond.

Example 9

9 mg of cobalt(II) tetraphenylporphyrin and 98 mg of Ketjenblack were dispersed in 50 ml of acetone. After drying the dispersion system, the powder obtained was dispersed again in 400 µL of acetone, and the dispersion was applied onto carbon paper and fired at 450° C. for 3 hours to obtain a first electrode (metal content: 0.6 mass %).

50 µL of a Nafion (trademark) dispersion was dripped onto the first electrode, and the first electrode was laminated with a second electrode obtained in the same manner as in Example 1 and Nafion. The laminate was hot-pressed at 59 MPa and 413 K, to fabricate a membrane-electrode assembly. The membrane-electrode assembly was set at the center of a two-compartment diaphragm type cell having spaces for a cathode compartment and an anode compartment, to construct a carbon dioxide reduction device.

Example 10

The same operation as in Example 9 was performed, except that 9 mg of nickel(II) tetraphenylporphyrin was used instead of 23 mg of cobalt(II) tetraphenylporphyrin to obtain a first electrode (metal content: 0.6 mass %).

Example 11

The same operation as in Example 9 was performed, except that 8 mg of copper(II) tetraphenylporphyrin was used instead of 23 mg of cobalt(II) tetraphenylporphyrin to obtain a first electrode (metal content: 0.6 mass %).

Example 12

The same operation as in Example 9 was performed, except that 4 mg of bis(dithiobenzyl)nickel(II) was used instead of 23 mg of cobalt(II) tetraphenylporphyrin, and DMF was used instead of acetone to obtain a first electrode (metal content: 0.6 mass %).

Example 13

40 mg of poly(4-vinylpyridine) (P4VP) was dispersed in 50 ml of ethanol to obtain a P4VP dispersion. 1.7 ml of 20 mM of $Mn(II)(NO_3)_2$/ethanol solution and 54 mg of Ketjenblack were mixed with the P4VP dispersion, and the mixture was dried to obtain powder. 8 mg of the powder was dispersed in 400 μL of acetone, and the dispersion was applied to a carbon paper (non-woven carbon fabric, product name "28BC", available from SGL Carbon AG) heated to 40° C. and fired at 450° C. for 3 hours to obtain a first electrode (metal content: 0.6 mass %). 50 μL of a Nafion dispersion was dripped onto the first electrode, and the first electrode was laminated with a second electrode obtained in the same manner as in Example 1 and Nafion. The laminate was hot-pressed at 59 MPa and 413 K, to fabricate a membrane-electrode assembly. The membrane-electrode assembly was set at the center of a two-compartment diaphragm type cell having spaces for a cathode compartment and an anode compartment to construct a carbon dioxide reduction device.

Example 14

The same operation as in Example 13 was performed, except that 20 mM of $Fe(II)(NO_3)_2$/ethanol solution was used instead of $Mn(II)(NO_3)_2$ to obtain a porous electrode (metal content: 0.6 weight %).

Example 15

The same operation as in Example 13 was performed, except that 20 mM of $Co(II)(NO_3)_2$/ethanol solution was used instead of $Mn(II)(NO_3)_2$ to obtain a porous electrode (metal content: 0.6 weight %).

Example 16

The same operation as in Example 13 was performed except that 20 mM of $Co(II)(NO_3)_2$/ethanol solution was used instead of $Mn(II)(NO_3)_2$, and 1,2-dimethylimidazole was used instead of P4VP to obtain a porous electrode (metal content: 0.6 weight %).

Example 17

The same operation as in Example 13 was performed, except that 20 mM of $Co(II)(NO_3)_2$/ethanol solution was used instead of $Mn(II)(NO_3)_2$, and 4,4'-dimethyl-2,2'-bipyridine was used instead of P4VP to obtain a porous electrode (metal content: 0.6 weight %).

Example 18

The same operation as in Example 13 was performed, except that 20 mM of $Co(II)(NO_3)_2$/ethanol solution was used instead of $Mn(II)(NO_3)_2$, and a polythiophene was used instead of P4VP to obtain a porous electrode (metal content: 0.6 weight %).

Example 19

The same operation as in Example 13 was performed, except that 20 mM of $Ni(II)(NO_3)_2$/ethanol solution was used instead of $Mn(II)(NO_3)_2$ to obtain a porous electrode (metal content: 0.6 weight %).

Example 20

The same operation as in Example 13 was performed, except that 20 mM of $Cu(II)(NO_3)_2$/ethanol solution was used instead of $Mn(II)(NO_3)_2$ to obtain a porous electrode (metal content: 0.7 weight %).

Example 21

The same operation as in Example 13 was performed, except that 20 mM of $Mo(III)Cl_3$/ethanol solution was used instead of $Mn(II)(NO_3)_2$, and the firing was performed at 650° C. for 3 hours to obtain a porous electrode (metal content: 1.0 mass %).

Example 22

The same operation as in Example 13 was performed, except that 20 mM of $Nb(V)Cl_5$/ethanol solution was used instead of $Mn(II)(NO_3)_2$, and the firing was performed at 650° C. for 3 hours to obtain a porous electrode (metal content: 1.0 mass %).

Example 23

The same operation as in Example 13 was performed, except that polystyrene was used instead of P4VP, and the firing was performed at 550° C. for 3 hours to obtain a porous electrode (metal content: 0.6 mass %).

Example 24

The same operation as in Example 13 was performed, except that polystyrene was used instead of P4VP, 20 mM of $Fe(II)(NO_3)_2$/ethanol solution was used instead of $Mn(II)(NO_3)_2$, and the firing was performed at 550° C. for 3 hours to obtain a porous electrode (metal content: 0.6 mass %).

Example 25

The same operation as in Example 13 was performed, except that polystyrene was used instead of P4VP, 20 mM of $Co(II)(NO_3)_2$/ethanol solution was used instead of $Mn(II)(NO_3)_2$, and the firing was performed at 550° C. for 3 hours to obtain a porous electrode (metal content: 0.6 mass %).

Example 26

The same operation as in Example 13 was performed, except that polystyrene was used instead of P4VP, 20 mM of Ni(II)(NO$_3$)$_2$/ethanol solution was used instead of Mn(II)(NO$_3$)$_2$, and the firing was performed at 550° C. for 3 hours to obtain a porous electrode (metal content: 0.6 mass %).

Example 27

The same operation as in Example 13 was performed, except that 10 mM of In(III)(NO$_3$)$_3$/DMF solution was used instead of Mn(II)(NO$_3$)$_2$, and the firing was performed at 650° C. for 3 hours to obtain a porous electrode (metal content: 0.6 mass %).

Example 28

The same operation as in Example 13 was performed, except that 10 mM of Pb(II)(NO$_3$)$_2$/DMF solution was used instead of Mn(II)(NO$_3$)$_2$, and the firing was performed at 650° C. for 3 hours to obtain a porous electrode (metal content: 1.1 mass %).

Example 29

The same operation as in Example 13 was performed, except that 10 mM of Sb(III)Cl$_3$/DMF solution was used instead of Mn(II)(NO$_3$)$_2$, and the firing was performed at 650° C. for 3 hours to obtain a porous electrode (metal content: 0.7 mass %).

Example 30

The same operation as in Example 13 was performed, except that 10 mM of Bi(III)(NO$_3$)$_2$/DMF solution was used instead of Mn(II)(NO$_3$)$_2$, and the firing was performed at 650° C. for 3 hours to obtain a porous electrode (metal content: 1.1 mass %).

Comparative Example 1

The same operation as in Example 1 was performed, except that a composition for porous electrode was prepared without using TPB to obtain a porous carbon not comprising a M-R bond.

Comparative Example 2

30 mg of silver nanoparticles (available from Sigma-Aldrich Co. LLC.) and 3 mg of PTFE were dispersed in 0.3 ml of isopropanol, and the dispersion was coated on carbon paper by splay. This was dried by heating at 80° C. for 1 hour and then at 120° C. for 1 hour to obtain a first electrode.

Subsequently, a second electrode was obtained in the same manner as in Example 1. The first electrode and second electrode obtained were laminated with an ion conducting membrane made of Nafion (trademark), and the laminate was hot-pressed at 59 MPa and 413 K, to fabricate a membrane-electrode assembly. The laminated film was set at the center of a two-compartment diaphragm type cell having spaces for a cathode compartment and an anode compartment, to construct a carbon dioxide reduction device.

Comparative Example 3

The same operation as in Example 13 was performed, except that P4VP and Mn(II)(NO$_3$)$_2$ were not used.

Comparative Example 4

40 mg of 4,4'-dimethyl-2,2'-bipyridine was dispersed in 50 ml of ethanol to obtain a P4VP dispersion. 20 mM of Co(II)(NO$_3$)$_2$/1.7 ml of ethanol solution and 54 mg of Ketjenblack were mixed with the P4VP dispersion, and the mixture was dried and fired at 450° C. for 3 hours. 8 mg of the resulted powder and 40 µL of a Nafion dispersion (10 mass %) were dispersed in 400 µL of acetone, and the dispersion was applied to carbon paper (non-woven carbon fabric, product name "28BC", available from SGL Carbon AG) heated to 40° C., to form a first electrode.

The first electrode was laminated with a second electrode obtained in the same manner as in Example 1 and Nafion, and the laminate was hot-pressed at 59 MPa and 413 K, to fabricate a membrane-electrode assembly. The membrane-electrode assembly was set at the center of a two-compartment diaphragm type cell having spaces for a cathode compartment and an anode compartment, to construct a carbon dioxide reduction device.

While a cathode potential of −0.6 V (SHE) was applied at 273 K to the carbon dioxide reduction device of each of Examples and Comparative Examples, the current was monitored, and generation of carbon monoxide was analyzed by gas chromatography (GC), to determine the efficiency (current efficiency) of reducing carbon dioxide relative to the energized current. Further, the current efficiency after the voltage was continuously applied for one hour was determined, and the ratio thereof relative to the initial current efficiency was taken as a retention ratio. For each of the current efficiency and the retention ratio, 70% or more and 100% or less was evaluated as "A", 30% or more and less than 70% was evaluated as "B", and 0% or more and less than 30% was evaluated as "C".

TABLE 1

| | First electrode | Current efficiency | Retention ratio |
|---|---|---|---|
| Example 1 | Bi—C-containing porous carbon | B | A |
| Example 2 | Sb—C-containing porous carbon | A | A |
| Example 3 | Ni—C-containing porous carbon | B | A |
| Example 4 | Co—C-containing porous carbon | A | A |
| Example 5 | Ru—C-containing porous carbon | B | A |
| Example 6 | Ag—N-containing porous carbon | A | A |
| Example 7 | Co—N-containing porous carbon | A | A |
| Example 8 | Ni—S-containing porous carbon | A | A |
| Example 9 | Co—N-containing porous carbon | A | A |
| Example 10 | Ni—N-containing porous carbon | A | A |
| Example 11 | Cu—N-containing porous carbon | B | A |
| Example 12 | Ni—S-containing porous carbon | A | A |
| Example 13 | Mn—N-containing porous carbon | A | A |
| Example 14 | Fe—N-containing porous carbon | A | A |
| Example 15 | Co—N-containing porous carbon | A | A |
| Example 16 | Co—N-containing porous carbon | A | A |
| Example 17 | Co—N-containing porous carbon | A | A |
| Example 18 | Co—S-containing porous carbon | A | A |
| Example 19 | Ni—N-containing porous carbon | A | A |
| Example 20 | Cu—N-containing porous carbon | B | A |
| Example 21 | Mo—N-containing porous carbon | A | A |
| Example 22 | Nb—N-containing porous carbon | A | A |
| Example 23 | Mn—C-containing porous carbon | B | A |
| Example 24 | Fe—C-containing porous carbon | B | A |
| Example 25 | Co—C-containing porous carbon | A | A |
| Example 26 | Ni—C-containing porous carbon | A | A |
| Example 27 | In—N-containing porous carbon | B | A |
| Example 28 | Pb—N-containing porous carbon | A | A |
| Example 29 | Sb—N-containing porous carbon | A | A |
| Example 30 | Bi—N-containing porous carbon | B | A |
| Comparative Example 1 | Porous carbon 1 | C | A |
| Comparative Example 2 | Ag-supported porous carbon | A | C |

TABLE 1-continued

|  | First electrode | Current efficiency | Retention ratio |
|---|---|---|---|
| Comparative Example 3 | Porous carbon 2 | C | A |
| Comparative Example 4 | Co—N -supported carbon | A | C |

As shown in Table 1, both the current efficiency and the retention ratio were good in Examples, since the porous carbon had a metal-nonmetal element bond represented by M-R. In contrast, either the current efficiency or the retention ratio was low in Comparative Examples 1 to 4, since the porous carbon did not have a metal-nonmetal element bond represented by M-R.

REFERENCE SIGNS LIST 10, 20: Carbon dioxide reduction device
11: First electrode (porous electrode)
12: Second electrode
13: Ion conducting membrane
14: Membrane-electrode assembly
15: Cathode compartment
16: Anode compartment
17A, 17B: Inlet port
18A. 18B: Outlet port
19: Power source
21: Electrolytic cell
22: Electrolyte solution

The invention claimed is:

1. A method for producing a porous electrode comprising a porous carbon, the method comprising:
    applying a metal complex, or a metal ion and an organic compound having R onto a non-woven carbon fabric, followed by heating at 200 to 550° C. to obtain the porous electrode,
    wherein the porous carbon comprising at least one type of metal-nonmetal element bond represented by M-R,
    wherein M represents a metal element of Groups 4 to 15, and
    wherein R represents a nonmetal element of Groups 14 to 16.

2. The method for producing a porous electrode according to claim 1, wherein
    the metal complex comprises at least one selected from the group consisting of triphenyl complexes, porphyrin complexes, phthalocyanine complexes, and dithiolene complexes.

3. The method for producing a porous electrode according to claim 1, wherein
    the metal ion comprises at least one selected from the group consisting of nitrate ion, sulfate ion, chloride ion, bromide ion, iodide ion, and hydroxide ion, and
    the organic compound comprising R comprises at least one selected from the group consisting of poly(4-vinylpyridine), polyanilines, polythiophenes, bipyridine derivatives, imidazole derivatives, and pyrazole derivatives.

4. The method for producing a porous electrode according to claim 1, wherein the metal complex is a complex of the metal element M, and a metal of the metal ion is the metal element M.

5. The method for producing a porous electrode according to claim 1, wherein the metal complex and an electrically conductive carbon, or the metal ion, the organic compound having R and an electrically conductive carbon are applied on the non-woven carbon fabric.

6. The method for producing a porous electrode according to claim 1, wherein the metal element M is chemically bonded to any one of a carbon element constituting the porous carbon and nitrogen element, sulfur element, or oxygen element which is covalently bonded to the carbon element by the heating.

7. The method for producing a porous electrode according to claim 1, wherein the heating occurs at a temperature in the range of 200 to 450° C.

* * * * *